(12) United States Patent
Singh

(10) Patent No.: US 11,603,041 B2
(45) Date of Patent: *Mar. 14, 2023

(54) VEHICLE HATCH CLEARANCE DETERMINING SYSTEM

(71) Applicant: MAGNA ELECTRONICS INC., Auburn Hills, MI (US)

(72) Inventor: Jagmal Singh, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,058

(22) Filed: Sep. 20, 2021

(65) Prior Publication Data
US 2022/0001800 A1 Jan. 6, 2022

Related U.S. Application Data

(63) Continuation of application No. 15/953,933, filed on Apr. 16, 2018, now Pat. No. 11,124,113.
(Continued)

(51) Int. Cl.
*B60Q 9/00* (2006.01)
*B60J 5/10* (2006.01)
(Continued)

(52) U.S. Cl.
CPC .............. *B60Q 9/005* (2013.01); *B60J 5/101* (2013.01); *B60Q 9/008* (2013.01); *B60R 1/00* (2013.01);
(Continued)

(58) Field of Classification Search
CPC ..................................................... E05F 15/40
See application file for complete search history.

(56) References Cited

U.S. PATENT DOCUMENTS

| 5,550,677 | A | 8/1996 | Schofield et al. |
| 5,670,935 | A | 9/1997 | Schofield et al. |

(Continued)

FOREIGN PATENT DOCUMENTS

| DE | 102011010242 A1 | 8/2011 |
| DE | 102010009889 A1 | 9/2011 |

OTHER PUBLICATIONS

Brose Technik fur Automobile Press Release, IAA 2011.

*Primary Examiner* — Peter D Nolan
*Assistant Examiner* — Ce Li Li
(74) *Attorney, Agent, or Firm* — Honigman LLP

(57) ABSTRACT

A vehicle hatch clearance determining system includes a plurality of cameras disposed at the vehicle and a control having a processor for processing image data captured by the cameras. During a parking event, and responsive to processing of captured image data, the system detects objects, gathers information pertaining to detected objects exterior the vehicle and generates an environmental model based at least in part on the gathered information. With the vehicle parked, the system determines location of the vehicle relative to at least one detected object of the environmental model and determines if the model includes an object in a region that would be swept by a hatch of the parked vehicle when the hatch is being opened or closed. Responsive to determination that the object is in the region that would be swept by the hatch, the system stops movement of the hatch to avoid impact with the object.

27 Claims, 2 Drawing Sheets

Related U.S. Application Data

(60) Provisional application No. 62/486,662, filed on Apr. 18, 2017.

(51) Int. Cl.

| | | |
|---|---|---|
| *B60R 1/00* | (2022.01) | |
| *E05F 15/40* | (2015.01) | |
| *E05F 15/73* | (2015.01) | |
| *G06T 7/70* | (2017.01) | |
| *H04N 7/18* | (2006.01) | |

(52) U.S. Cl.
CPC .............. *E05F 15/40* (2015.01); *E05F 15/73* (2015.01); *G06T 7/70* (2017.01); *H04N 7/181* (2013.01); *B60R 2300/105* (2013.01); *B60R 2300/301* (2013.01); *B60R 2300/8066* (2013.01); *B60R 2300/8093* (2013.01); *E05F 2015/767* (2015.01); *E05Y 2400/53* (2013.01); *E05Y 2900/532* (2013.01); *G06T 2207/30261* (2013.01)

(56) References Cited

U.S. PATENT DOCUMENTS

| | | | |
|---|---|---|---|
| 5,949,331 A | 9/1999 | Schofield et al. | |
| 6,836,209 B2 | 12/2004 | Ploucha | |
| 7,026,930 B2 | 4/2006 | Appel et al. | |
| 7,280,035 B2 | 10/2007 | McLain et al. | |
| 7,528,703 B2 | 5/2009 | Touge | |
| 7,547,058 B2 | 6/2009 | King et al. | |
| 8,638,205 B2 | 1/2014 | Boehme et al. | |
| 8,830,317 B2 | 9/2014 | Meier | |
| 9,068,390 B2 | 6/2015 | Ihlenburg et al. | |
| 11,124,113 B2 | 9/2021 | Singh | |
| 2002/0084675 A1 | 7/2002 | Buchanan et al. | |
| 2007/0236364 A1 | 10/2007 | Hubbard et al. | |
| 2007/0273554 A1 | 11/2007 | Sakakibara | |
| 2007/0296242 A1 | 12/2007 | Frommer et al. | |
| 2008/0294314 A1 | 11/2008 | Morris et al. | |
| 2009/0000196 A1 | 1/2009 | Kollar et al. | |
| 2011/0043633 A1 | 2/2011 | Sarioglu et al. | |
| 2011/0175752 A1 | 7/2011 | Augst | |
| 2011/0196568 A1 | 8/2011 | Nickolaou et al. | |
| 2013/0235204 A1 | 9/2013 | Buschmann | |
| 2014/0098230 A1 | 4/2014 | Baur | |
| 2014/0168415 A1 | 6/2014 | Ihlenburg et al. | |
| 2014/0168437 A1 | 6/2014 | Rother et al. | |
| 2014/0218529 A1 | 8/2014 | Mahmoud et al. | |
| 2014/0313339 A1 | 10/2014 | Diessner | |
| 2014/0340510 A1 | 11/2014 | Ihlenburg et al. | |
| 2015/0022664 A1 | 1/2015 | Pflug et al. | |
| 2016/0082887 A1* | 3/2016 | Turk | B60R 1/00 701/300 |
| 2017/0030136 A1 | 2/2017 | Ihlenburg et al. | |
| 2017/0314318 A1 | 11/2017 | Hassenpflug | |

\* cited by examiner

VEHICLE HATCH CLEARANCE DETERMINING SYSTEM

CROSS REFERENCE TO RELATED APPLICATIONS

The present application is a continuation of U.S. patent application Ser. No. 15/953,933, filed Apr. 16, 2018, now U.S. Pat. No. 11,124,113, which claims the filing benefits of U.S. provisional application Ser. No. 62/486,662, filed Apr. 18, 2017, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system. The present invention utilizes such a vehicle camera or sensor to determine structure at and around the vehicle, such as while the vehicle is being driven in a parking structure, and stores the data so that, when the vehicle is parked at a parking space, the system has stored data pertaining to the structure at or near or above the vehicle. The vehicle includes a vehicle hatch control system or clearance determining system that may detect or determine that an object or structure is present in the sweeping or turning area or path of a vehicle hatch (such as a vehicle hatch that is being opened or closed, such as via a powered opening/closing system of the vehicle) and, responsive to such determination, the system may stop or reverse the hatch to limit or avoid collision of the hatch with the object present in its path. The system utilizes the stored data to determine objects or structure that may be above the vehicle and out of the field of view of the camera of the vehicle when the vehicle is parked, and thus provides enhanced control of the hatch when the vehicle is parked.

These and other objects, advantages, purposes and features of the present invention will become apparent upon review of the following specification in conjunction with the drawings.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver or opens the tailgate or rear door of the vehicle.

Figure 1:
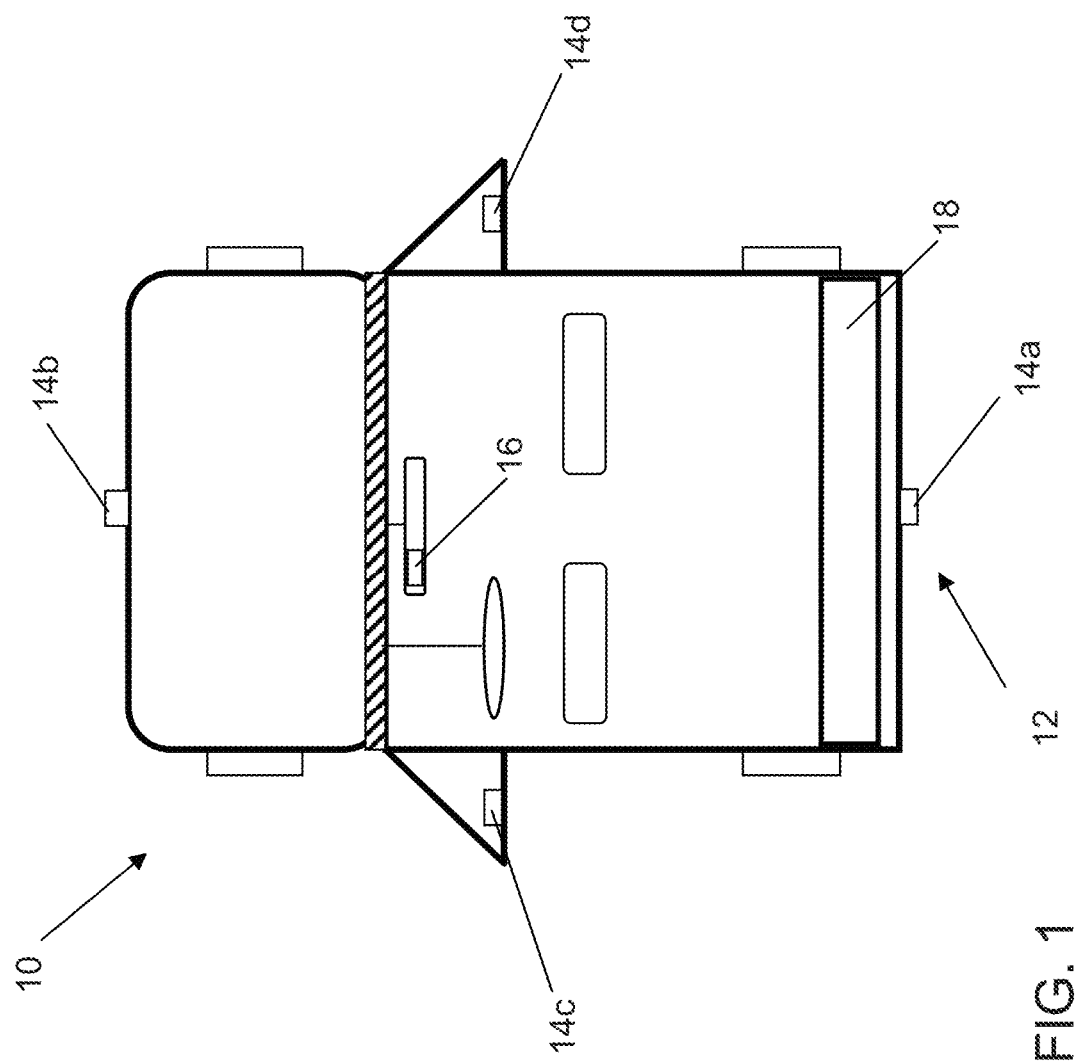
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward viewing imaging sensor or camera 14a and/or a forward viewing camera 14b at the front (or at the windshield) of the vehicle, and/or a sideward/rearward viewing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

The present invention provides a hatch control system or hatch collision avoidance system or hatch clearance determining system for a vehicle that is operable to stop the opening or closing of a hatch or trunk lid or lift gate or deck lid or rear door of a vehicle when it is determined that an object is in the path of travel of the hatch and will be contacted or impacted by the hatch if the hatch continues towards its fully opened or fully closed position. For example, the system, responsive to a determination that an object or structure is outside of the vehicle and above or rearward of the hatch and in the path of travel of the hatch when opening (and with the system optionally monitoring the path of travel responsive to an opening of the hatch or activation of a powered hatch opening/closing device or the like), is operable to stop movement or opening of the hatch at a predetermined or selected or appropriate distance from the object such that a gap is provided between the stopped partially opened hatch and the detected object. The system may utilize aspects of the systems described in U.S. Publication Nos. US-2014-0207344 and/or US-2011-0043633, and/or U.S. patent application Ser. No. 15/832,802, filed Dec. 6, 2017, which published on Jun. 7, 2018 as U.S. Patent Publication No. US-2018-0154864, which are hereby incorporated herein by reference in their entireties.

The vehicle may have a plurality of cameras, such as having two forward vision cameras comprising a stereo vision system or four surround view vision cameras disposed at the front, rear and the sides of the vehicle, or such as having a camera array disposed around the vehicle and comprising a Stanford light field vision system that may have an image processing system (hardware with processor, memory and optionally FPGAs, DSPs and/or ASICs) capable to process the environmental scene and provide object detection and optionally the vehicle ego motion (relative to the scene) by algorithms processing the image data captured by one or more or all of the vehicle exterior viewing cameras, and optionally otherwise attached or otherwise connected cameras such as processing attached aftermarket camera's images, or processing images provided by a wirelessly connected smart phone camera which is disposed outwardly within or at the ego vehicle. Optionally, the scene and object detection and the optional ego motion detection algorithm may additionally process or fuse data of additional sensors such as RADAR, LIDAR structured light or ultrasonic sensors for enhanced detection capabilities and redundancy.

Figure 2:
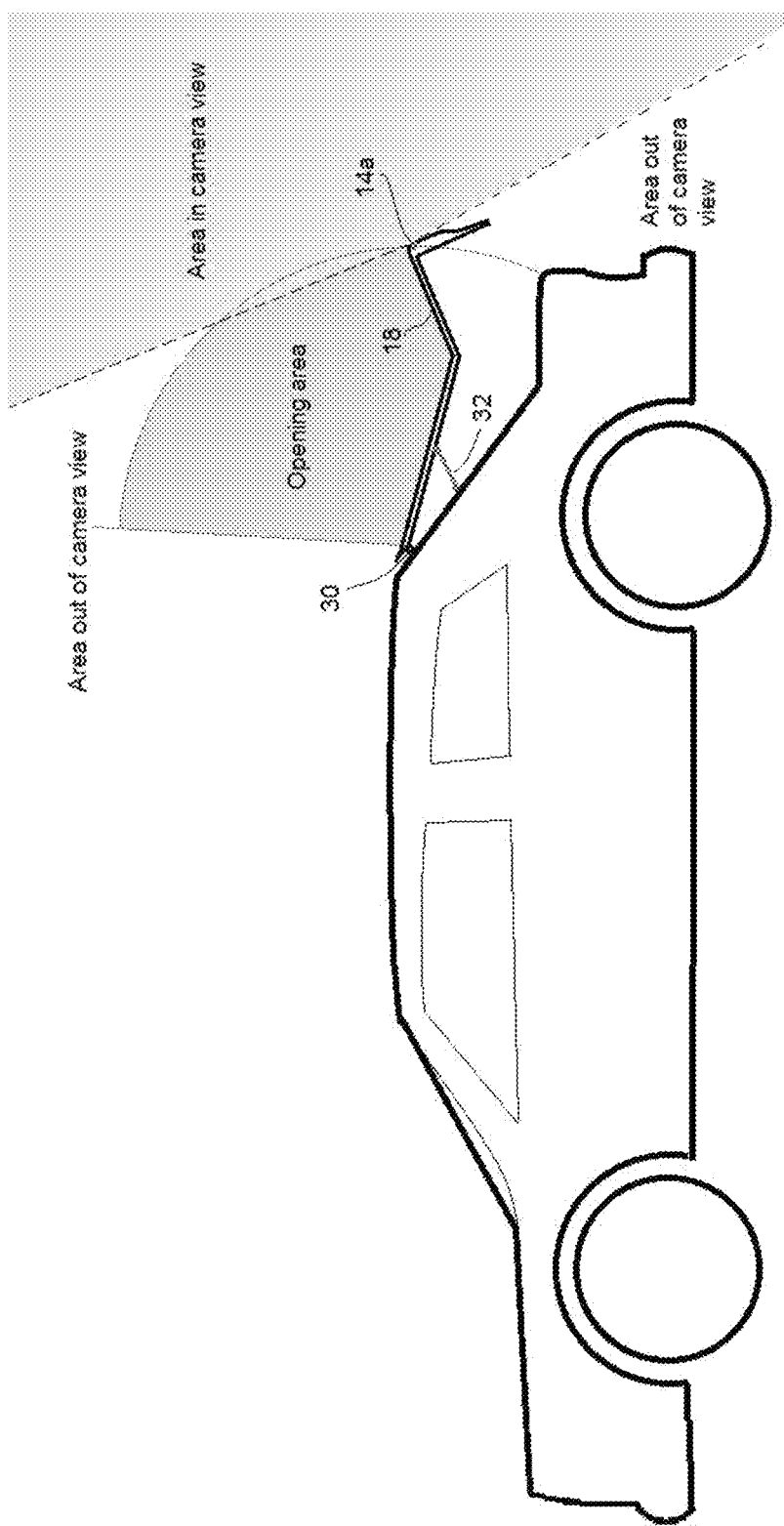
FIG. 2 is a side view of a vehicle with a rear camera of a hatch clearance determining system mounted at the emblem position of the hatch and providing an exterior field of view in accordance with the present invention.

The vehicle has an actuated (automated and propelled) hatch, rear door or trunk lid, in the following referred as just "actuated hatch", with a control for controlling the actuation (opening and/or closing). Systems are known for preventing the automated hatch from colliding with outside objects in the path of the actuated hatch's sweep, such as described in U.S. Publication No. US-2014-0207344, which is hereby incorporated herein by reference in its entirety. The detecting systems and methods for detecting collision hazard objects include "Structured light", "Stereo [disparity"] vision processing and "Structure from Motion" (SfM) processing. The SfM object detection provides for the motion of the actuated hatch that has a (rear) camera itself (such as shown in FIG. 2), when actuated or driven manually. The motion of the ego vehicle is assumed as zero since in a parked state. When using the object detection system described in the above referenced U.S. Publication No. US-2014-0207344 when using SfM object detection, the hazard objects can only be detected after the motion of the hatch (itself) has started and the hazard object comes into the camera view before the collision.

The multi camera vision system of the present invention may detect the (static) object's or room structure's inner surface (such as in a parking garage structure) that is/are around and above the vehicle and may store the extensions and positions while the vehicle is being driven for use (such as when the vehicle is driven during a parking event such as when the driver is looking for an available or suitable parking space) when the driven vehicle comes to a halt, possibly stopping for parking. Since a vehicle is typically narrowing to the later taken parking spot, the structure around and especially above the vehicle may be in view at least from a distant view point of the vehicle camera(s) before getting out of the camera's view when the vehicle is driven underneath the structure. The system provides a data storing feature that stores the information or data of the previously detected objects or structures, and the system may determine where the vehicle is located relative to detected objects and/or structures, and may calculate whether or not one or more of the structure's surfaces or objects is violating the potential sweeping space of the actuated hatch when opening automatically or hand driven. The system of the present invention then may warn the driver or take counter measures such as stopping the hand driven or automated actuation at a distance from the hazardous surface or object to avoid collision.

Thus, during the vehicle motion (such as when the vehicle is driven in a parking garage while the driver is looking for a suitable parking space), the surround view cameras are scanning the surrounding regions and generating a 3D environmental model using structure from motion (SfM) technology. 3D point cloud data are stored not just for the front of the vehicle in forward motion or rear of the vehicle in rear-motion, but 3D point cloud of sufficiently larger areas beyond the vehicle is also stored. Vehicle odometer and vehicle dynamics can provide/determine the exact or approximate location of the vehicle (and vehicle hatch) within this 3D point cloud or environmental model or virtual map, which can be used to compute the maximum possible opening height of the hatch at any given location that was previously scanned by one or more vehicle cameras or sensors as the vehicle was being driven during the parking event.

Optionally, the room's surface map (such as a map of structure of a parking lot or parking garage) may be provided by a remote wirelessly connected server, such as a service of a public parking garage for improving the surface collision hazard calculation, which may be limited due to low light or low contrast conditions limited processing power.

The system thus may determine structure or objects via processing of data captured by one or more cameras or sensors of the vehicle as the vehicle is being driven, and, responsive to such processing, may determine when structure is at or near the vehicle and intruding a sweep path of a vehicle hatch when the vehicle is parked at a parking space (or otherwise not moving). The system thus provides object or structure detection while the vehicle is being driven and, based on stored data, can determine if an object or structure is in the path of a door or hatch when the vehicle is parked.

Thus, during a parking event (such as when the vehicle is driven while the driver is looking for a parking space), image data is captured by vehicular cameras (and/or other data is sensed and collected by other sensors of the vehicle) and processed to detect objects and/or structure at the parking area (the parking garage or lot or street). The system may be actuated at the onset of a parking event, such as via a user input or upon detection or determination that the vehicle is entering a parking garage or lot or the like (such as via a communication or scanning as the vehicle enters or crosses a threshold of the parking structure such as a parking garage or parking lot), whereby the system processes image data captured by the surround view cameras or forward and/or rearward and/or sideward viewing cameras (and/or data collected or sensed by other sensors) to determine structure and objects in the parking area. The system generates the virtual map or environmental model or the like based on image data captured during driving and parking of vehicle and not based on image data captured by a camera at or near the vehicle hatch after the vehicle is parked (optionally, the cameras do not capture image data and the processor does not process captured image data after the vehicle is parked and during any subsequent opening or closing of the hatch or door or decklid or liftgate or the like).

The virtual map or environmental model is thus made while the vehicle is still moving, whereby, after the vehicle is parked in a selected parking space, the system determines the location of the vehicle relative to previously determined structure and can provide an alert to the driver as to an obstruction in the way of the vehicle hatch before the hatch is even opened or started to open. Thus, the driver, upon receiving an alert as the vehicle is parked in a parking space, may move the vehicle forward or otherwise re-position the vehicle to avoid the detected structure, without having to get out of the vehicle to see if there is clearance and without having to actuate a hatch release and start movement of the hatch toward an open position.

Optionally, the system may adjust the position of the hatch to maintain the gap. For example, the system may, when the hatch is partially opened and near an object above the hatch, and when the vehicle is unloaded so that the vehicle body raises upward, be operable to adjust or move the hatch to further close the hatch so that the initial gap is generally maintained between the partially opened hatch and the detected object. The system may include or may be responsive to a camera or image sensor or other sensor at or of the vehicle (such as a camera that is part of a vehicle vision system or surround view vision system or the like) that has a field of view that encompasses the region exterior of the vehicle that is swept by the hatch when opening/closing, and/or may include or may be responsive to a camera or image sensor or other sensor at or of the vehicle that has a field of view that encompasses the rear storage area or region of the vehicle.

The system may use a safety remaining distance control to stop the hatch at a distance before contact with the detected or determined object or structure, and the stopping point (where the system generates a signal to stop the hatch) may have a safety remaining gap or distance or travel (between the hatch and the object) that reflects or accounts for the potential stopping reaction and additional travel of the hatch after the signal is generated (such as due to reaction times of the system and the mass inertia swinging of the hatch and/or the like). An additional cause for height change reflected in the safety remaining gap or distance may be that the vehicle suspension springs may lift the vehicle some centimeters (such as, for example, about 15 cm or thereabouts) or the vehicle may roll or pitch when a heavy load is unloaded from the trunk or rear cargo area or when one or more persons exit the vehicle. That safety distance may be a (eventually opening dependent and or voltage dependent, or hatch propulsion motor speed dependent) parameter set for the particular power liftgate, hatch, door or lid application.

Optionally, as another aspect of the invention, the vehicle hatch, liftgate door or trunk lid collision avoidance system may also work when not being adjusted by the power actuators, and when the hatch, door or lid is being opened/closed manually by a user of the vehicle. The system may still detect objects in the path of travel of the power hatch. The actuators may be dynamically controlled (such as via counter actuation or braking) against the manual adjustment direction to actively avoid a threatened contact or collision with an object. Optionally, the system may first act comparably vigorously or aggressively to bring the adjustment to a stop, but then may then substantially reduce the resistance to allow the user/driver to draw the hatch closer to the object when the user still pushes the lid or door or hatch towards the object and overcomes the initial aggressive counter actuation.

In automotive driver assistance systems, object detection (OD) systems and algorithms may be used, such as described in International Publication Nos. WO 2013/081984 and/or WO 2013/081985, and/or U.S. Publication No. US-2015-0175072, which are hereby incorporated herein by reference in their entireties. These are mainly based on back projection and/or structure from motion using mono (rear) cameras. Optionally, a distance estimation or determination may be provided via one or more vehicle sensors, such as via stereovision sensors, motion parallax/structure from motion (motion disparity) by mono cameras, a LIDAR sensor, a RADAR sensor, a time of flight (TOF) sensor, a photonic mixer device (PMD), and/or a structured light sensor, such as by utilizing aspects of the systems described in International Publication No. WO 2013/109869, which is hereby incorporated herein by reference in its entirety, and/or the like.

Thus, the present invention provides a vision system that, utilizing one or more cameras, provides a feature detection algorithm (that may utilize disparity mapping or the like, such as by utilizing aspects of the cameras and systems described in International Publication Nos. WO 2013/081984 and/or WO 2013/081985, which are hereby incorporated herein by reference in their entireties) or a combination of various detection algorithms and the like. Such feature detection may be used for discrimination of objects or structure (such as learned or critical or potentially hazardous objects or the like) in the vicinity of the vehicle. The known (learned) critical areas with the according environmental features may be stored in a local or remote database. Such data storage may be done in combination to stored hatch opening limits stored by the user in previous uses of the hatch at specific locations (such as, for example, the users home parking garage, the users work place parking garage, a general/specific parking location or space, and/or the local airport's parking garage and/or the like).

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096: US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,575,160; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484 and/or U.S. Publication Nos. US-2018-0045812; US-2018-0015875; US-2017-0356994; US-2017-0315231; US-2017-0276788; US-2017-0254873; US-2017-0222311 and/or US-2010-0245066 and/or U.S. patent application Ser. No. 15/897,268, filed Feb. 15, 2018, now U.S. Pat. No. 10,782,388, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicle hatch clearance determining system, said vehicle hatch clearance determining system comprising:
 a plurality of cameras disposed at a vehicle equipped with said vehicle hatch clearance determining system and having respective exterior fields of view exterior of the equipped vehicle;
 wherein said plurality of cameras includes at least (i) a forward viewing camera having a forward field of view forward of the equipped vehicle and (ii) a rearward viewing camera having a rearward field of view rearward of the equipped vehicle;
 wherein each camera of said plurality of cameras comprises a two dimensional imaging array having at least million photosensors arranged in rows and columns;
 a control comprising a processor for processing image data captured by said plurality of cameras;
 wherein said vehicle hatch clearance determining system, during a parking event, and responsive to processing at said control by said processor of image data captured by said plurality of cameras, detects objects exterior the vehicle during the parking event;
 wherein said vehicle hatch clearance determining system, responsive to processing at said control by said processor of image data captured by said plurality of cameras during the parking event, gathers information pertaining to detected objects exterior the vehicle during the parking event;
 wherein said vehicle hatch clearance determining system generates an environmental model based at least in part on the gathered information, the environmental model comprising a three dimensional environmental model of where the equipped vehicle moves during the parking event including the detected objects;

wherein, with the equipped vehicle parked at a parking location, said vehicle hatch clearance determining system, responsive to processing at said control by said processor of captured image data, determines location of the equipped vehicle relative to at least one detected object of the generated three dimensional environmental model and, based on the determined location of the equipped vehicle relative to the at least one detected object, determines if the generated three dimensional environmental model includes an object in a region that would be swept by a hatch of the parked equipped vehicle when the hatch is being opened or closed; and wherein, responsive to determination that the object is in the region that would be swept by the hatch at the parking location, said vehicle hatch clearance determining system stops movement of the hatch to avoid impact with the object.

2. The vehicle hatch clearance determining system of claim 1, wherein said processor at said control processes image data captured by said plurality of cameras to detect objects present in a parking facility while the equipped vehicle is being driven in the parking facility while a driver of the equipped vehicle is looking for a parking space, and wherein, when the equipped vehicle is parked in a parking space, said vehicle hatch clearance determining system determines if the gathered information includes the object in the region that would be swept by the hatch.

3. The vehicle hatch clearance determining system of claim 1, wherein, responsive to determination of a potential collision of the hatch with the object in the region that would be swept by the hatch, said vehicle hatch clearance determining system generates an alert comprising at least one selected from the group consisting of an audible alert and a visual alert.

4. The vehicle hatch clearance determining system of claim 3, wherein said vehicle hatch clearance determining system generates the alert responsive to actuation of a powered hatch opening/closing system of the equipped vehicle.

5. The vehicle hatch clearance determining system of claim 3, wherein said vehicle hatch clearance determining system generates the alert responsive to a manual opening or closing of the hatch of the equipped vehicle.

6. The vehicle hatch clearance determining system of claim 1, wherein said vehicle hatch clearance determining system stops movement of the hatch at a distance from the object in the region that would be swept by the hatch.

7. The vehicle hatch clearance determining system of claim 1, wherein said vehicle hatch clearance determining system generates an alert in the equipped vehicle to alert a user that the gathered information includes the object in the region that would be swept by the hatch of the parked equipped vehicle when the hatch is being opened or closed, and wherein the alert is generated when the equipped vehicle is parked at the parking location and before opening of the hatch.

8. The vehicle hatch clearance determining system of claim 1, wherein the hatch comprises a liftgate of the equipped vehicle.

9. The vehicle hatch clearance determining system of claim 1, wherein the hatch comprises a deck lid of the equipped vehicle.

10. The vehicle hatch clearance determining system of claim 1, wherein said vehicle hatch clearance determining system generates the three dimensional environmental model using structure from motion (SfM).

11. The vehicle hatch clearance determining system of claim 1, wherein said processor at said control processes image data captured by said plurality of cameras and said vehicle hatch clearance determining system gathers information pertaining to detected objects exterior the vehicle responsive to a trigger at the start of the parking event.

12. The vehicle hatch clearance determining system of claim 11, wherein the trigger comprises one selected from the group consisting of (i) a user input and (ii) determination that the equipped vehicle has entered a parking facility.

13. The vehicle hatch clearance determining system of claim 1, wherein said plurality of cameras comprise (i) a driver-side viewing camera having a driver-side field of view sideward of a driver side of the equipped vehicle and (ii) a passenger-side viewing camera having a passenger-side field of view sideward of a passenger side of the equipped vehicle.

14. The vehicle hatch clearance determining system of claim 13, wherein said plurality of cameras are part of a surround view system of the equipped vehicle, and wherein said surround view system comprises a display screen that displays video images derived from image data captured by each camera of said plurality of cameras.

15. A vehicle hatch clearance determining system, said vehicle hatch clearance determining system comprising:

a plurality of cameras disposed at a vehicle equipped with said vehicle hatch clearance determining system and having respective exterior fields of view exterior of the equipped vehicle;

wherein said plurality of cameras includes at least (i) a forward viewing camera having a forward field of view forward of the equipped vehicle, (ii) a rearward viewing camera having a rearward field of view rearward of the equipped vehicle, (iii) a driver-side viewing camera having a driver-side field of view sideward of a driver side of the equipped vehicle and (iv) a passenger-side viewing camera having a passenger-side field of view sideward of a passenger side of the equipped vehicle;

wherein each camera of said plurality of cameras comprises a two dimensional imaging array having at least million photosensors arranged in rows and columns;

a control comprising a processor for processing image data captured by said plurality of cameras;

wherein said vehicle hatch clearance determining system, during a parking event, and responsive to processing at said control by said processor of image data captured by said plurality of cameras, detects objects exterior the vehicle during the parking event;

wherein said vehicle hatch clearance determining system, responsive to processing at said control by said processor of image data captured by said plurality of cameras during the parking event, gathers information pertaining to detected objects exterior the vehicle during the parking event;

wherein said vehicle hatch clearance determining system generates an environmental model based at least in part on the gathered information, the environmental model comprising a three dimensional environmental model of where the equipped vehicle moves during the parking event including the detected objects;

wherein, with the equipped vehicle parked at a parking location, said vehicle hatch clearance determining system, responsive to processing at said control by said processor of captured image data, determines location of the equipped vehicle relative to at least one detected object of the generated three dimensional environmental model and, based on the determined location of the equipped vehicle relative to the at least one detected object, determines if the generated three dimensional environmental model includes an object in a region that would be swept by a hatch of the parked equipped vehicle when the hatch is being opened or closed;

wherein the hatch comprises a liftgate of the equipped vehicle; and wherein, responsive to determination that the object is in the region that would be swept by the hatch at the parking location, said vehicle hatch clearance determining system stops movement of the hatch to avoid impact with the object.

16. The vehicle hatch clearance determining system of claim 15, wherein, responsive to determination of a potential collision of the hatch with the object in the region that would be swept by the hatch, said vehicle hatch clearance determining system generates an alert comprising at least one selected from the group consisting of an audible alert and a visual alert.

17. The vehicle hatch clearance determining system of claim 16, wherein said vehicle hatch clearance determining system generates the alert responsive to actuation of a powered hatch opening/closing system of the equipped vehicle.

18. The vehicle hatch clearance determining system of claim 15, wherein said vehicle hatch clearance determining system stops movement of the hatch at a distance from the object in the region that would be swept by the hatch.

19. The vehicle hatch clearance determining system of claim 15, wherein said processor at said control processes image data captured by said plurality of cameras and said vehicle hatch clearance determining system gathers information pertaining to detected objects exterior the vehicle responsive to a trigger at the start of the parking event, and wherein the trigger comprises one selected from the group consisting of (i) a user input and (ii) determination that the equipped vehicle has entered a parking facility.

20. The vehicle hatch clearance determining system of claim 15, wherein said plurality of cameras are part of a surround view system of the equipped vehicle, and wherein said surround view system comprises a display screen that displays video images derived from image data captured by each camera of said plurality of cameras.

21. A vehicle hatch clearance determining system, said vehicle hatch clearance determining system comprising:

a plurality of cameras disposed at a vehicle equipped with said vehicle hatch clearance determining system and having respective exterior fields of view exterior of the equipped vehicle;

wherein said plurality of cameras includes at least (i) a forward viewing camera having a forward field of view forward of the equipped vehicle and (ii) a rearward viewing camera having a rearward field of view rearward of the equipped vehicle;

wherein each camera of said plurality of cameras comprises a two dimensional imaging array having at least million photosensors arranged in rows and columns;

a control comprising a processor for processing image data captured by said plurality of cameras;

wherein said vehicle hatch clearance determining system, during a parking event, and responsive to processing at said control by said processor of image data captured by said plurality of cameras, detects objects present exterior the vehicle during the parking event;

wherein said vehicle hatch clearance determining system, responsive to processing at said control by said processor of image data captured by said plurality of cameras during the parking event, gathers information pertaining to detected objects exterior the vehicle during the parking event;

wherein said vehicle hatch clearance determining system generates an environmental model based at least in part on the gathered information, the environmental model comprising a three dimensional environmental model of where the equipped vehicle moves during the parking event including the detected objects;

wherein, with the equipped vehicle parked at a parking location, said vehicle hatch clearance determining system, responsive to processing at said control by said processor of captured image data, determines location of the equipped vehicle relative to at least one detected object of the generated three dimensional environmental model and, based on the determined location of the equipped vehicle relative to the at least one detected object, determines if the generated three dimensional environmental model includes an object in a region that would be swept by a hatch of the parked equipped vehicle when the hatch is being opened or closed;

wherein the hatch comprises a liftgate of the equipped vehicle;

wherein, responsive to determination of a potential collision of the hatch with the object in the region that would be swept by the hatch, said vehicle hatch clearance determining system generates an alert comprising at least one selected from the group consisting of an audible alert and a visual alert; and wherein, responsive to determination that the object is in the region that would be swept by the hatch at the parking location, said vehicle hatch clearance determining system stops movement of the hatch to avoid impact with the object.

22. The vehicle hatch clearance determining system of claim 21, wherein said processor at said control processes image data captured by said plurality of cameras to detect objects present in a parking facility while the equipped vehicle is being driven in the parking facility while a driver of the equipped vehicle is looking for a parking space, and wherein, when the equipped vehicle is parked in a parking space, said vehicle hatch clearance determining system determines if the gathered information includes the object in the region that would be swept by the hatch.

23. The vehicle hatch clearance determining system of claim 21, wherein said vehicle hatch clearance determining system generates the alert responsive to actuation of a powered hatch opening/closing system of the equipped vehicle.

24. The vehicle hatch clearance determining system of claim 21, wherein said vehicle hatch clearance determining system stops movement of the hatch at a distance from the object in the region that would be swept by the hatch.

25. The vehicle hatch clearance determining system of claim 21, wherein said vehicle hatch clearance determining system generates the three dimensional environmental model using structure from motion (SfM).

26. The vehicle hatch clearance determining system of claim 21, wherein said processor at said control processes image data captured by said plurality of cameras and said vehicle hatch clearance determining system gathers information pertaining to detected objects exterior the vehicle responsive to a trigger at the start of the parking event.

27. The vehicle hatch clearance determining system of claim 26, wherein the trigger comprises one selected from the group consisting of (i) a user input and (ii) determination that the equipped vehicle has entered a parking facility.

\* \* \* \* \*